P. S. COMBS, Jr.
PIPE CONNECTION.
APPLICATION FILED MAY 3, 1919.

1,326,392.

Patented Dec. 30, 1919.
2 SHEETS—SHEET 1.

Witness:
Geo. J. Dubois

Inventor:
Presley S. Combs, Jr.,
By Luther Johns
Atty.

P. S. COMBS, Jr.
PIPE CONNECTION.
APPLICATION FILED MAY 3, 1919.

1,326,392.

Patented Dec. 30, 1919.
2 SHEETS—SHEET 2.

UNITED STATES PATENT OFFICE.

PRESLEY S. COMBS, JR., OF CHICAGO, ILLINOIS.

PIPE CONNECTION.

1,326,392.  Specification of Letters Patent.  Patented Dec. 30, 1919.

Application filed May 3, 1919. Serial No. 294,474.

*To all whom it may concern:*

Be it known that I, PRESLEY S. COMBS, Jr., a citizen of the United States, residing at Chicago, in the county of Cook and State of Illinois, have invented certain new and useful Improvements in Pipe Connections, of which the following is a specification.

My invention relates to connections for pipes, with more particular reference to means for connecting branch pipes to mains while the latter contains liquid or gas pressure.

Devices of this general character are well known. The general object of all such devices is to provide a connection whereby the main may be tapped while under pressure and a branch pipe connected to the main at that place. The more specific objects of the present improvements are to provide a construction which shall be peculiarly strong and permanent after installation; which may be of relatively light weight; which has its various members so disposed that the necessary calking of the lead gasket may be done readily and effectively, which may be easily applied to the pipe, an important feature considering the difficult situations for work in which such connections are usually made; and to provide improved means for carrying out the general objects of devices of this kind. An important specific object is to provide a device which will strongly reinforce the pipe at the sides and opposite the saddle, in order to maintain the required resistance to internal pressure at this weakened portion of the pipe. A further specific object is to provide a device of such structural design that all of its parts which are subject to strain after installation may be of cast iron, thereby presenting a higher resistance to disintegration under ground than either wrought iron or steel would do. Other objects and advantages will appear hereinafter.

Figure 1:
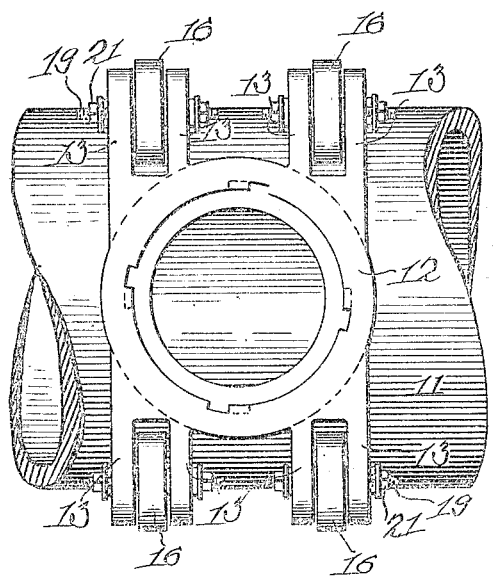
Figure 2:
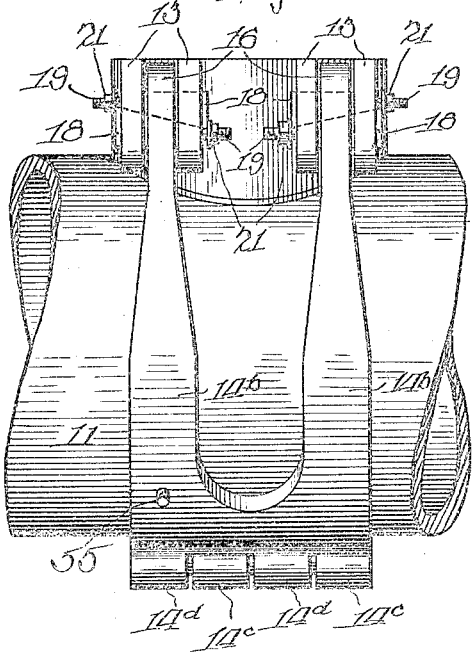
Figure 3:
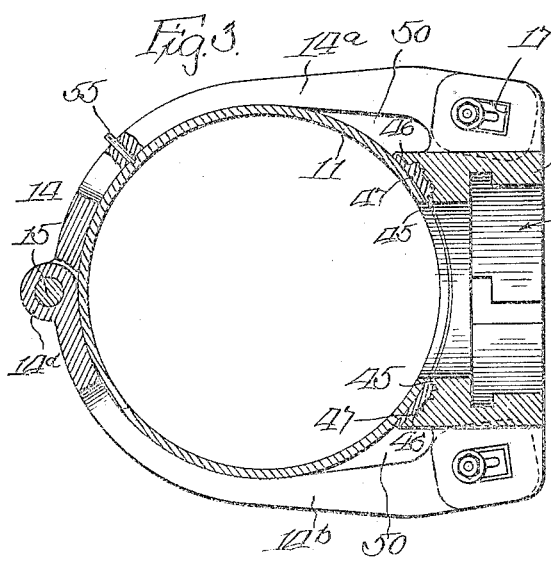
Figure 7:
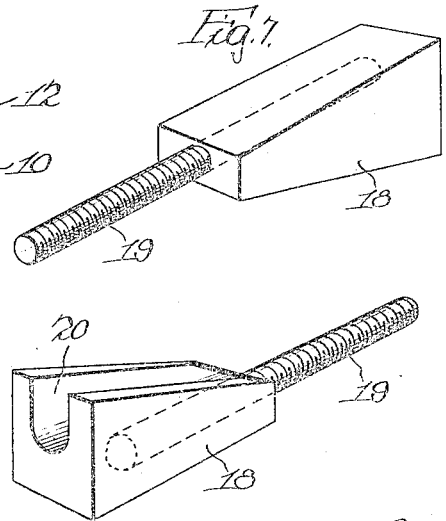
Figure 4:
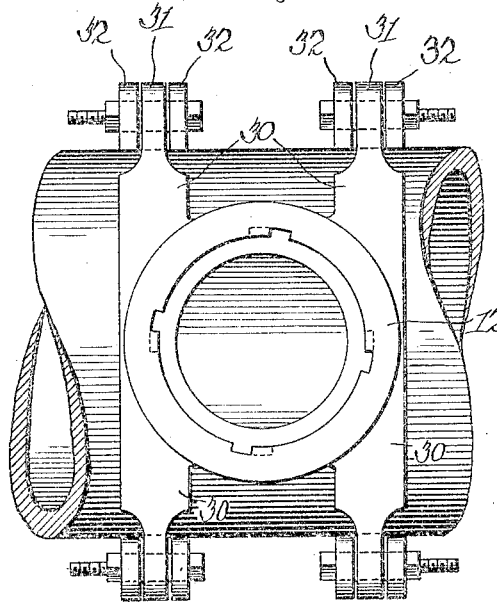
Figure 5:
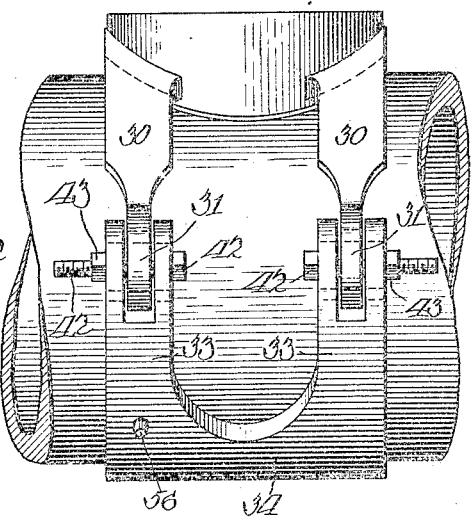
Figure 6:
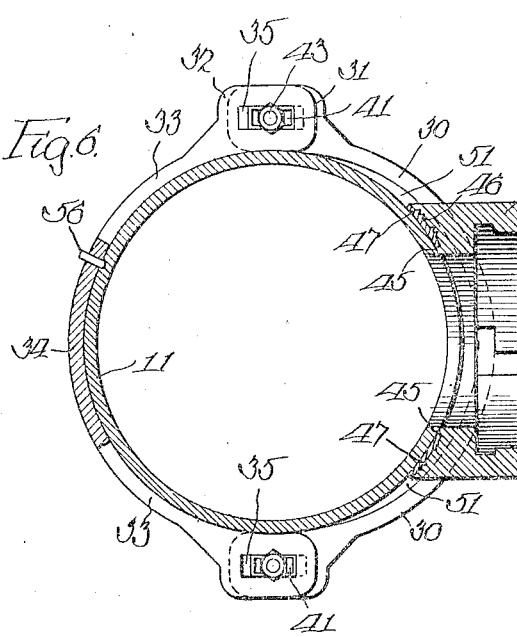
Figure 8:
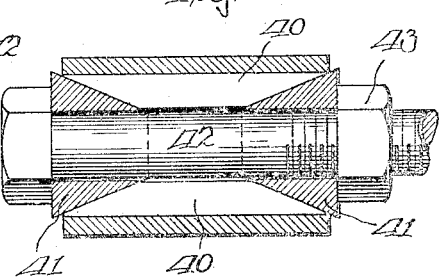

In the accompanying drawings, which form a part of this specification, I have illustrated preferred and modified embodiments of what I now consider the most advantageous forms of my new device. In these drawings Figure 1 is a front view of the preferred form in normal position upon a main; Fig. 2 is a plan view thereof, Fig. 3 is a medial section transversely through the device and main; Figs. 4, 5 and 6 are views of the same kind respectively as are Figs. 1, 2 and 3 but showing the modified construction; Fig. 7 is an enlarged perspective view of two coöperating wedge members; and Fig. 8 is an enlarged medial longitudinal section through a modified form of wedging device.

Such connections usually consist of two main parts which may be described as the saddle and yoke. The saddle is tubular, having a circular opening, as 10, adapted to receive the end of a pipe (not shown), which pipe may have valve connections and boring devices for tapping the main 11, all as is well understood in the art.

In my improvements, according to the preferred construction, the saddle 12 has two pairs of bifurcated ears 13 integral therewith and extending outwardly therefrom. The yoke 14 consists of two arms 14$^a$ and 14$^b$, the arms 14$^a$ terminating in hinge knuckles 14$^c$—14$^c$ while the arms 14$^b$ terminate in knuckles 14$^d$—14$^d$. The hinge pin 15 holds these arms strongly yet flexibly together. It is pointed out that by arranging the hinge knuckles for the two arm or strap members as shown in Fig. 2 a single pattern will suffice for the yoke parts 14$^a$ and 14$^b$, these parts being identical with each other, thus saving expense in manufacture and also insuring the provision of suitable parts at a given time and place through the avoidance of mistakes which commonly occur in providing suitable parts which are formed as "rights and lefts."

The end portions 16 of the arms 14$^a$ and 14$^b$ interfit loosely in the bifurcation of the ears 13 respectively. A rectangular opening 17 is formed in the ears 13 and also in the ends 16, and, when the yoke and saddle are drawn tightly upon the pipe these openings 17 are substantially in alinement with each other. Within these openings 17 I insert the oppositely disposed wedge blocks 18, identical with each other, each block having a threaded stud 19 projecting from its smaller end, and each block having a channel 20 adapted to receive the stud 19 of the opposite member. The coöperative arrangement of these wedging blocks is seen in Fig. 2, from which illustration it at once appears that by tightening the nuts 21 the wedge blocks 18 are caused to slide upon each other and widen the distance between their opposite faces in the up-and-down directions as viewed in Fig. 2, the result being that the saddle 12 and yoke 14 are drawn toward each other tightly upon the main 11, In the modified device of Figs. 4, 5 and 6 the saddle 12 has two pairs of projecting arms 30 cast integral therewith, these arms having widened end portions 31 adapted to fit loosely in the bifurcated ends 32 of the yoke arms 33 respectively, which arms issue from the yoke body 34. The interfitting end members 35 are apertured with a rectangular opening 40 in all respects the same as the opening 17, Fig. 3, adapted to receive wedging members like those of Fig. 7, or like those of Fig. 8, the latter being illustrated as the one employed in the modified construction.

The wedging device of Fig. 8 comprises a pair of upper and lower blocks 40 and a pair of end blocks 41, the respective pairs of blocks being tapered inwardly toward each other, the end blocks 41 being apertured longitudinally to receive the bolt 42. It will be clear that by tightening the nut 43 upon this bolt the blocks 41 are drawn toward each other, spreading apart the blocks 40. The effect of this wedging action is to draw the saddle 12 and the yoke 33 and 34 tightly upon the main 11.

It will be noted that the yoke 14 and 34 is each a strong and rigid member and conforms accurately to the shape of the pipe throughout half its circumference at the connection; and it will be observed also that the yoke is materially wide in the direction of the pipe length. It will also be noted that the pulling strains upon the saddle 12 are applied at relatively widely spaced apart portions, and are directed substantially to points or localities about one quarter of a circumference from each other.

The saddle 12 in each instance is formed to fit upon the pipe 11, resting thereon at the annular rim or rib 45, Fig. 3 and Fig. 6, a channel 46 being provided in the face portion of the saddle adapted to receive lead packing 47.

According to this construction the saddle may be drawn tightly and evenly upon the main 11 by pulling strains covering a relatively wide area and which may be so evenly and regularly applied, by successive applications of the wrench to the various nuts of the wedging device, that the parts will come together upon the pipe with an unusual solidity, firmness and rigidity, affording the desired protection against leakage both during the tapping operation and during the many years that the connection is desired to remain in place.

The rigidity of the yoke members and their fitting upon a large area of the pipe not only provides the strong and important reinforcement for the pipe hereinabove referred to, but the rigidity of the yoke and its fitting pipe contribute to the rigidity of the attachment as a whole, and, in connection with the wedging block tightening means, which themselves constitute an inflexible connection, the device as a whole becomes substantially as rigid as though the several parts were integral with each other. Furthermore as this rigid connection contacts the pipe over most of its area at the connection it becomes very much in the nature of an integral part of the pipe itself.

It will be noted from Fig. 3 that a space 50 occurs between the pipe and the yoke at the inner edge of the saddle 12, a similar space 51 being shown in Fig. 6. This space is provided in each case to facilitate calking the lead gasket 47 which is poured into the channel 46 in the face portion of the saddle 12.

Another advantageous feature of construction is the provision of a pin 55, Fig. 3, and 56, Fig. 6, tightly fitting in a hole bored in the yoke members respectively and projecting about half way into the main 11. This locking pin is applied in practice by boring into the main 11 a short distance after the parts are connected upon the pipe in their final position and then driving the steel pin 55 and 56 into the yoke and part way into the main. Its effect is to lock the device as a whole against movement upon the pipe. It is pointed out that the tapping operation tends to cause the connection to move, and it often happens, too, that after the work has been completed the unequal settling of the main and branch pipes will cause the connection to move upon the pipe and cause a leak at the gasket joint. The provision of this locking device successfully overcomes the danger in this respect.

The saddle and the yoke members are preferably made of cast iron, this material being relatively highly resistant to the corrosive influences encountered under ground. The studs 19 of the wedging blocks are preferably of wrought iron while the wedging blocks 18 are preferably of cast iron, the studs 19 being placed in the molds and secured in the blocks by casting around them. The wedging elements of Fig. 8 with the exception of the bolt are also preferably of cast iron.

A device so constructed will last long in service and, importantly, will maintain itself so firmly and rigidly between the branch pipe and the main that the danger of leakage is effectively overcome.

I claim:

1. In a device of the character described, the combination of a saddle having a face formed substantially to fit upon a pipe and having channel means in the face portion adapted to accommodate packing, a yoke having a body portion substantially oppositely disposed to the saddle, the yoke having a plurality of spaced-apart rigid arms normally on each side of the pipe, the ends of the arms respectively interfitting with correspondingly spaced-apart portions of the saddle, the end portion of each arm and the respective interfitting portions of the saddle being apertured transversely with substantially alining openings when the yoke arms and saddle are in their tightened together position, and wedging members in said substantially alining openings for tightening the yoke and saddle together upon a pipe.

2. In a device of the character described, the combination of a saddle having a face formed substantially to fit upon a pipe and having channel means in the face portion adapted to accommodate a packing, a yoke having a body portion substantially oppositely disposed to the saddle, the yoke having a plurality of rigid spaced-apart arms normally on each side of the pipe, the body portion of the yoke and the arms thereof having their inner surfaces on semi-cylindrical lines so as to fit tightly upon the semi-cylindrical part of the pipe which is opposite the saddle, to reinforce the pipe, the arms beyond the portions thus adapted to contact the pipe being normally spaced from the pipe to provide clearance for calking the packing, the ends of the arms respectively interfitting with portions of the saddle, the end portion of each arm and the respective interfitting portions of the saddle being apertured transversely with substantially alining openings when the yoke arms and saddle are in their tightened-together position, and wedging members in said substantially alining openings for tightening the yoke and saddle together upon a pipe.

3. In a device of the character described, the combination of a saddle having a face formed substantially to fit upon a pipe and having channel means in the face portion adapted to accommodate a packing, a yoke substantially oppositely disposed to the saddle, the yoke having a two-part body substantially the width of the device in the direction of the length of the pipe, and having its two parts hinged together substantially opposite the middle of the saddle, a plurality of rigid arms extending from each part of the yoke body toward the saddle, the ends of the arms respectively interfitting with portions of the saddle, the end portion of each arm and the interfitting portion of the saddle being apertured transversely with substantially alining openings when the yoke arms and saddle are in their tightened together position, and wedging members in said substantially alining openings.

4. In a device of the character described, the combination of a saddle and a yoke member oppositely disposed to each other, the yoke member having arms spaced apart normally on each side of the pipe, the arms respectively and the saddle having interfitting elements, the interfitting elements being apertured with substantially alining openings when the saddle and yoke are in their tightened-together position, and screw-operated wedging means in said alining openings for tightening the yoke and saddle upon a pipe.

5. In a device of the character described, the combination of a saddle and a yoke member oppositely disposed to each other the yoke member having arms spaced apart normally on each side of the pipe, the arms respectively and the saddle having interfitting elements, the interfitting elements being apertured with substantially alining openings when the saddle and yoke are in their tightened-together position, and wedging means in said alining openings for tightening the yoke and saddle upon a pipe, said means comprising a pair of oppositely positioned wedging blocks each having a threaded stud projecting longitudinally from its smaller end, each wedging block having a channel for the stud of the opposite block, substantially as described.

PRESLEY S. COMBS, Jr.